June 3, 1947.  L. A. McNABB  2,421,637
PREFOCUSED, QUICKLY ADJUSTABLE LIGHT SLIT FOR PHOTOELECTRIC SOUND HEADS
Filed Aug. 30, 1944  2 Sheets-Sheet 1
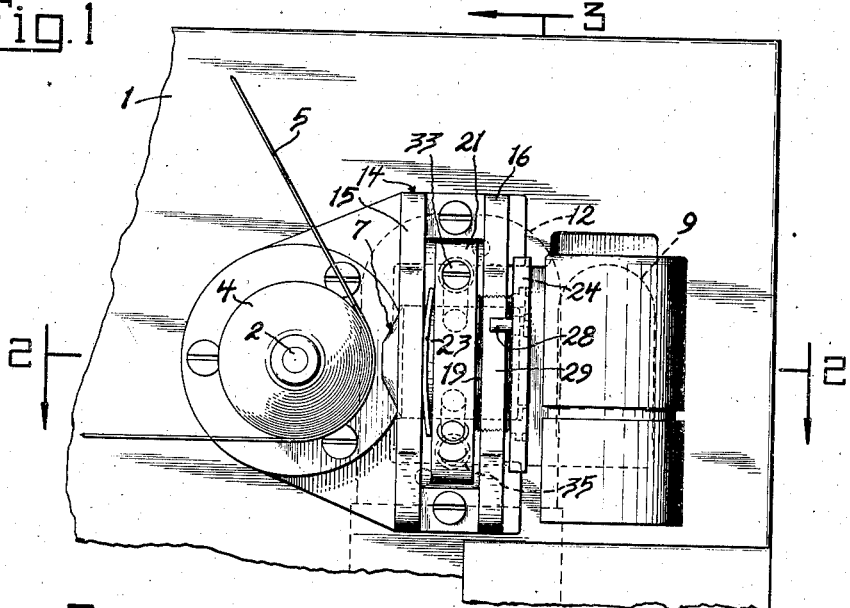
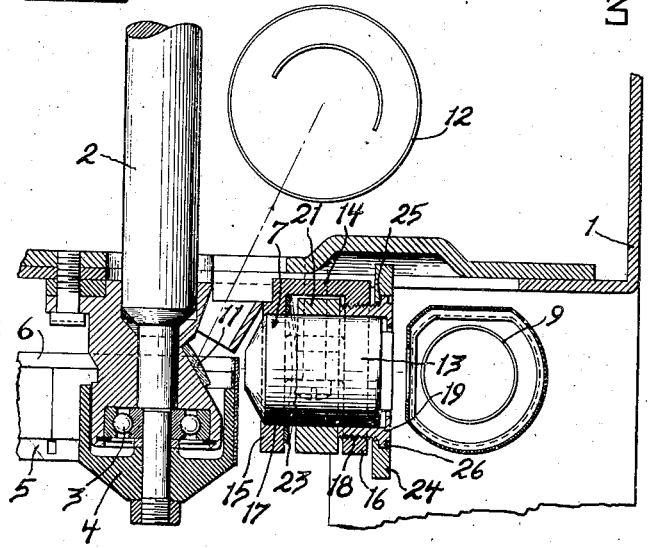
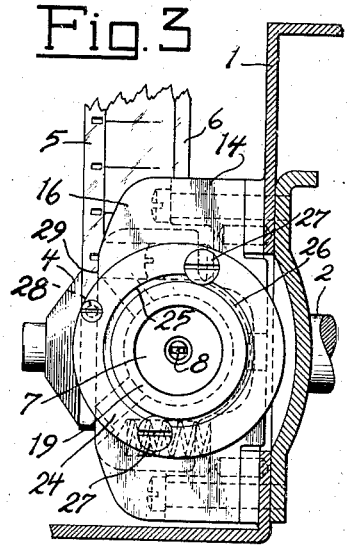
INVENTOR
LOUIS A. McNABB
BY Robert F. Miehle
ATTY.

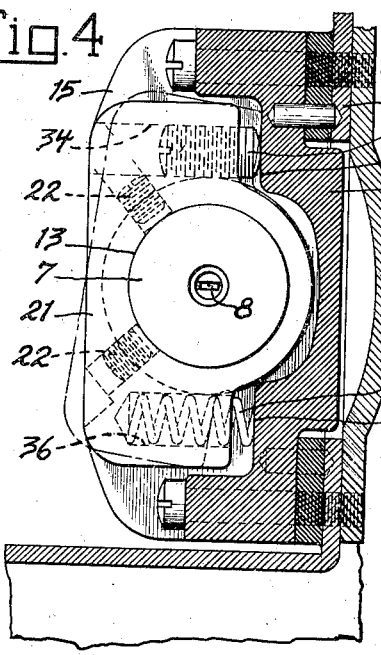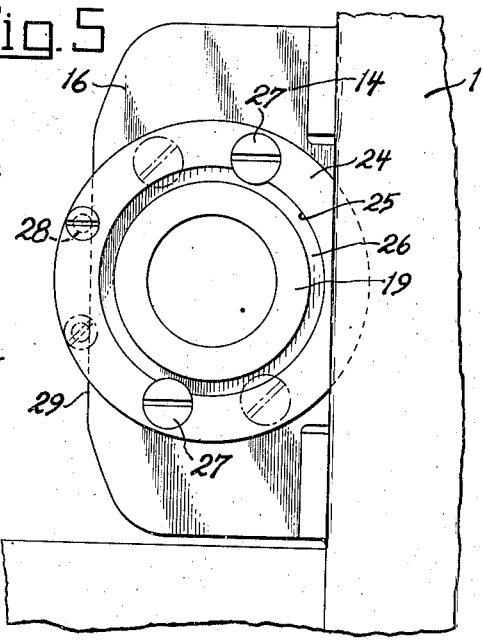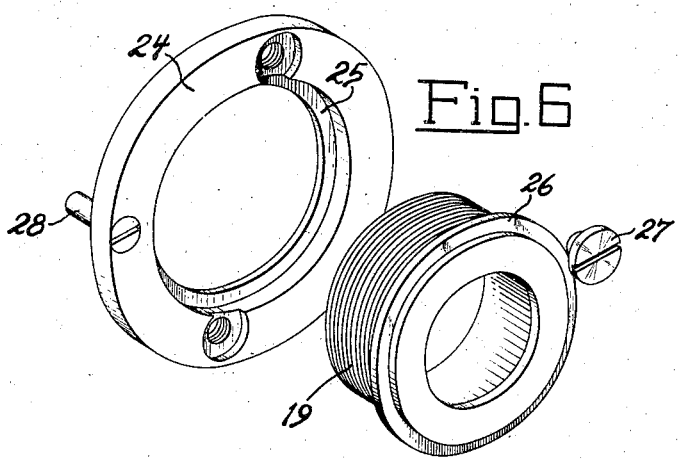

Patented June 3, 1947

2,421,637

UNITED STATES PATENT OFFICE 2,421,637

PREFOCUSED, QUICKLY ADJUSTABLE LIGHT SLIT FOR PHOTOELECTRIC SOUND HEADS

Louis A. McNabb, Glenview, Ill., assignor to The Bell & Howell Company, Chicago, Ill., a corporation of Illinois Application August 30, 1944, Serial No. 551,992

7 Claims. (Cl. 179—100.31)

My invention relates particularly to photoelectric sound translating devices such as are used in sound motion picture apparatus which employ usual feed perforated motion picture film as the sound and picture record medium, such a translating device including an optical slit projecting unit and a cooperating film guide means, such as a sound drum, which guides the film past the slit unit which is disposed in adjusted focused relation with the film so guided and projects an optical slit onto the fed film as an incident of recording or reproduction.

In practice it happens that, because of conditions unnecessary to state, some films require to be guided past the optical slit projecting unit with the photographic emulsion layer face of the film facing the slit unit while other films require to be guided past the slit unit with the photographic emulsion layer face of the film facing away from the slit unit, and because of the appreciable thickness of the film base which carries the emulsion layer, the change from the use of one of these types of film to that of the other requires that the slit unit be re-focused a fixed extent substantially equaling the thickness of the film for each such film type change in order that the projected optical slit be properly focused with respect to the emulsion layer of the film to be instantly used.

Objects of the invention reside in the provision of a novel and effective means for adjusting an optical slit projecting unit relative to its cooperating film guide means which provides for predeterminately positioning the slit unit at either extremity of a fixed extent of focusing adjustment thereof, thus facilitating or rendering automatically accurate the adjustment of the slit unit in either of two focused positions thereof, particularly with reference to so alternately focusing the slit unit for the alternate use of the said two types of film, which provides for focusing adjustment of the slit unit with reference to both of said positions so that the slit unit may be initially or factory adjusted as to proper focus relative to both of said positions, and which provides for convenient and accurate adjustable positioning of the slit unit angularly thereof, while permitting axial focusing adjustment of the same, for alining the projected optical slit transversely of the film guided by the guide means.

The invention will be better understood by reference to the accompanying drawing forming a part hereof and in which—

Figure 1 is a view in side elevation of a photoelectric sound translating device of the reproducing type, such as is used in sound motion picture projectors, and embodying my invention;

Figure 2 is a sectional view substantially on the line 2—2 of Figure 1;

Figure 3 is a sectional view substantially on the line 3—3 of Figure 1;

Figure 4 is a sectional view in elevation similar to that of Figure 3;

Figure 5 is a partial view of the device in rear elevation and with parts omitted; and Figure 6 is an exploded perspective view of parts forming one portion of the structure of the device.

Referring to the drawing, and particularly Figures 1 and 2, a frame is generally designated at 1, and a shaft 2 is carried for rotation on the frame by means of suitable bearings, one of which is shown at 3, the shaft being preferably provided as usual with an inertia device such as a flywheel, not shown, for rendering the rate of rotation thereof accurately constant. A sound drum 4 is secured on the extending end of the shaft 2 for rotation therewith and provides a guide means for guiding a usual feed perforated sound and motion picture record film 5 trained thereabout past the translating station of the translating device of which the drum forms a part, the film being fed about the drum at a constant rate by usual constant feed means not shown.

The sound record portion 6 of the film overhangs the inner end of the drum 4 so that light may be projected therethrough, see Figure 2, and a usual optical slit projecting unit 7 of usual construction and provided with a light slit 8 as shown in Figures 3 and 4, projects light through the light slit from an exciter lamp 9 onto and through the sound record portion 6 of the film, the slit unit being focused on the photographic emulsion layer of the film to project a sharply defined optical slit thereon. Light so projected through the sound record portion of the film and varied in intensity by the varying opacity of the sound record portion is transmitted by a reflector 11 to a usual photoelectric cell 12 which translates the light as varied by the sound record portion of the film into corresponding electrical impulses and coacts with the usual instrumentalities, not shown, to translate the light impulses into corresponding sound impulses.

The optical slit projecting unit 7 is provided with an axially extending concentric external cylindrical surface 13 and is mounted for axial and angular adjustment relative to the sound drum 4 in the following manner, axial adjustment of the slit unit providing for focusing adjustment of the slit unit relative to the film guided by the drum and angular adjustment of the slit unit providing for alining the projected optical slit transversely of the film.

A mounting member 14 is secured on the frame 1 and is provided with parallel portions 15 and 16 spaced along the axis of the slit unit. The portion 15 is provided with a bore 17 in which the cylindrical surface 13 of the slit unit has bearing engagement, and the portion 16 is provided with a threaded bore 18 coaxial with the bore 17 and spacedly surrounding the cylindrical surface 13. See particularly Figure 2. An externally threaded concentrically bored annular adjusting member 19 is threadedly engaged in the threaded bore 18 and has its bore engaged on the cylindrical surface 13 of the slit unit for angular and axial movement thereof relative to the slit unit.

An intermediately bored arm 21 has its bore engaged on the cylindrical surface 13 of the slit unit between the portions 15 and 16 of the mounting member 4 and is secured on the slit unit, as designated at 22 in Figure 4, and forms a collar fixed on the slit unit between the portions 15 and 16 and engaging the opposing end of the adjusting member 19. A spring washer 23 surrounds the cylindrical surface 13 of the slit unit and is operative between the portion 15 of the mounting member 4 and the collar forming arm 21 to maintain the arm in axial engagement with the adjusting member 19, thus providing thrust bearing means operative between the adjusting member and the slit unit to axially fix the same.

Accordingly, axial movement of the adjusting member 19, effected by angular movement thereof by reason of its threaded engagement in the bore 18, effects axial adjustment of the slit unit 7 for focusing the same with reference to the film 5 guided by the drum 4.

An annular member 24 is provided with a shouldered bore 25 which is engaged for rotation of the annular member on a circumferential flange 26 on the adjusting member 19, and headed screws 27 are screwthreaded into the member 24 at diametrically opposite positions thereon and releasably clamp the flange 26 between their heads and the shoulder of the bore 25 and thus secure the member 24 on the adjusting member 19 in angularly adjusted relation therewith. See particularly Figures 3, 5 and 6.

The member 24 is provided adjacent its periphery with an axially extending stop pin 28 which overlies a vertical stop surface 29 of the portion 16 of the mounting member 14, and this pin and surface form oppositely acting stop means operative to position the member 24 and the adjusting member 19, as adjustably secured with the member 24 by the screws 27, at opposite extremities of a fixed extent of angular movement thereof, one extremity of which is shown in full lines and the other extremity of which is shown in dot and dash lines in Figure 5.

By reason of the threaded engagement of the adjusting member 19 in the threaded bore 18 of the mounting member 14 and the thrust bearing means between the adjusting member 19 and the slit unit 7 previously described, positioning means is provided which is operative for predeterminately positioning the slit unit, relative to the sound drum 4 which guides the film, at either extremity of a fixed extent of axial or focusing adjustment thereof. Thus, adjustment of the slit unit in either of two focused positions thereof is facilitated or rendered automatically accurate. Where this positioning means is utilized in focusing the slit unit for the alternate use of the two types of film above described, the said extent of the axial or focusing adjustment of the slit unit substantially equals the thickness of the sound record film.

The adjustable means, provided by the screws 27 coacting with the shouldered bore 25 of the member 24 and the flange 26 of the adjusting member 19, serves also for axial or focusing adjustment of the slit unit 7 relative to the sound drum 4 and the film guided by the sound drum, and this adjustable means is operative in sequence with the positioning means for predeterminately positioning the slit unit at either extremity of a fixed extent of axial adjustment of the slit unit, so that this adjustable means provides for focusing adjustment of the slit unit with reference to both of the positions of the slit unit provided by said positioning means and consequently provides for initial or factory adjustment of the slit unit as to proper focus relative to both of said positions.

The portion of the mounting member 14 between the portions 15 and 16 thereof is provided with guides 31 and 32 extending longitudinally of the axis of the slit unit 7 and facing an axial plane of the slit unit. See particularly Figure 4.

A screw 33 is threadedly engaged in a bore 34 through one end portion of the arm 21 and extends in tangential relation with the slit unit axis, and this screw slidably engages the guide 31. A compression spring 35 is engaged in a blind bore 36 in the other end portion of the arm 21 and extends in tangential relation with the slit unit axis, and the spring engages the bottom of the bore 36 and slidably engages the guide 32 with its opposite ends and thus yieldably urges the arm 21 and with it the slit unit 7 in one direction angularly about the slit unit axis which movement is opposed by the screw 33 engaging the surface 31 for adjustably positioning the slit unit angularly about its axis, it being observed that these two oppositely acting positioning devices permit axial adjustment of the slit unit and provide convenient and effective adjustable positioning of the slit unit angularly about its axis for alining the light slit 8 transversely of the sound record film guide by the drum 4.

While I have thus described my invention, I do not wish to be limited to the precise details described, as changes may be readily made without departing from the spirit of my invention, but having thus described my invention, I claim as new and desire to secure by Letters Patent the following:

1. In a photoelectric sound translating device, the combination with an optical slit projecting unit axially adjustable relative to a cooperating sound record film guide means and having an axially extending concentric external cylindrical surface, of positioning means operative for predeterminately positioning said slit unit relative to said guide means at either extremity of a fixed extent of said axitl adjustment and comprising a stationary part provided with a threaded bore disposed concentrically of said slit unit, an externally threaded concentrically bored annular adjusting member threadedly engaged in said threaded bore and having its bore engaged on said cylindrical surface for angular and axial movement thereof relative to said slit unit, thrust bearing means operative between said adjusting member and said slit unit to axially fix the same, and oppositely acting stop means operative to position said adjusting member at opposite extremities of a fixed extent of angular movement thereof.

2. In a photoelectric sound translating device, the combination with an optical slit projecting unit axially adjustable relative to a cooperating sound record film guide means and having an axially extending concentric external cylindrical surface, of positioning means operative for predeterminately positioning said slit unit relative to said guide means at either extremity of a fixed extent of said axial adjustment and comprising a stationary part provided with a threaded bore disposed concentrically of said slit unit, an externally threaded concentrically bored annular adjusting member threadedly engaged in said threaded bore and having its bore engaged on said cylindrical surface for angular and axial movement thereof relative to said slit unit, thrust bearing means operative between said adjusting member and said slit unit to axially fix the same, and oppositely acting stop means operative to position said adjusting member at opposite extremities of a fixed extent of angular movement thereof and including a movable stop member and adjustable means operative to secure said stop member on said adjusting member in angularly adjusted relation therewith.

3. In a photoelectric sound translating device, the combination with an optical slit projecting unit axially adjustable relative to a cooperating sound record film guide means and having an axially extending concentric external cylindrical surface, of positioning means operative for predeterminately positioning said slit unit relative to said guide means at either extremity of a fixed extent of said axial adjustment and comprising a stationary structure provided with spaced portions of which a first of said portions is provided with a bore in which said cylindrical surface has bearing engagement and of which the second of said portions is provided with a threaded bore coaxial with said first mentioned bore, an externally threaded concentrically bored annular adjusting member threadedly engaged in said threaded bore and having its bore engaged on said cylindrical surface for angular and axial movement thereof relative to said slit unit, a collar fixed on said slit unit between said portions of said stationary structure and axially engaging the opposing end of said adjusting member, a spring surrounding said cylindrical surface and operative between said first portion of said stationary structure and said collar to maintain said collar in axial engagement with said adjusting member and thus axially fix said slit unit and adjusting member, and oppositely acting stop means operative between said stationary structure and said adjusting member to position said adjusting member at opposite extremities of a fixed extent of angular movement thereof.

4. In a photoelectric sound translating device, the combination with an optical slit projecting unit axially adjustable relative to a cooperating sound record film guide means and having an axially extending concentric external cylindrical surface, of positioning means operative for predeterminately positioning said slit unit relative to said guide means at either extremtiy of a fixed extent of said axial adjustment and comprising a stationary structure provided with spaced portions of which a first of said portions is provided with a bore in which said cylindrical surface has bearing engagement and of which the second of said portions is provided with a threaded bore coaxial with said first mentioned bore, an externally threaded concentrically bored annular adjusting member threadedly engaged in said threaded bore and having its bore engaged on said cylindrical surface for angular and axial movement thereof relative to said slit unit, a collar fixed on said slit unit between said portions of said stationary structure and axially engaging the opposing end of said adjusting member, a spring surrounding said cylindrical surface and operative between said first portion of said stationary structure and said collar to maintain said collar in axial engagement with said adjusting member and thus axially fix said slit unit and adjusting member, and oppositely acting stop means operative between said stationary structure and adjusting member to position said adjusting member at opposite extremities of a fixed extent of angular movement thereof and including a movable stop member and adjustable means operative to secure said stop member on said adjusting member in angularly adjusted relation therewith.

5. In a photoelectric sound translating device, the combination with an angularly adjustable optical slit projecting unit axially adjustable relative to a cooperating sound record film guide means, of positioning means operative to adjustably position said slit unit angularly of said slit unit while permitting axial adjustment of the same and comprising a stationary structure and two positioning devices oppositely operative between said slit unit and stationary structure angularly about the axis of said slit unit and respectively including adjustable devices correspondingly adjustable angularly about said axis and one of which devices comprises screwthreadedly engaged parts and a guide extending longitudinally of said axis and slidably engaged by one of said screwthreadedly engaged parts.

6. In a photoelectric sound translating device, the combination recited in claim 5 and further characterized in that the other of said adjustable devices comprises a spring device.

7. In a photoelectric sound translating device, the combination with an angularly adjustable optical slit projecting unit axially adjustable relative to a cooperating sound record film guide means and having an axially extending concentric external cylindrical surface, of positioning means operative for predeterminedly positioning said slit relative to said guide means at either extremity of a fixed extent of said axial adjustment and comprising a stationary structure provided with spaced portions of which a first of said portions is provided with a bore in which said cylindrical surface has bearing engagement and of which the second of said portions is provided with a threaded bore coaxial with said first mentioned bore, an externally threaded concentrically bored annular adjusting member threadedly engaged in said threaded bore and having its bore engaged on said cylindrical surface for angular and axial movement thereof relative to said slit unit, a bored arm engaged and fixed on said slit unit between said portions of said stationary structure and axially engaging the opposing end of said adjusting member, a spring operative to maintain said arm in axial engagement with said adjusting member and thus axially fix said slit unit and adjusting member, oppositely acting stop means operative on said adjusting member to position said adjusting member at opposite extremities of a fixed extent of angular movement thereof, and means operative between said arm and stationary structure to adjustably position said slit unit angularly of said slit unit while permitting axial adjustment of the same and comprising two positioning devices opposedly operative between said arm and stationary structure angularly above the axis of said slit unit and respectively including adjustable devices correspondingly adjustable angularly about said axis and one of which devices comprises screwthreadedly engaged parts and a guide extending longitudinally of said axis and slidably engaged by one of said screwthreadedly engaged parts.

LOUIS A. McNABB.

REFERENCES CITED

The following references are of record in the file of this patent:

UNITED STATES PATENTS

| Number | Name | Date |
| --- | --- | --- |
| 2,169,013 | Wittel | Aug. 8, 1939 |
| 2,308,015 | McLeod | Jan. 12, 1943 |